United States Patent

[11] 3,575,227

| [72] | Inventor | Donald R. Bartley |
| | | Cuyahoga Falls, Ohio |
| [21] | Appl. No. | 731,823 |
| [22] | Filed | May 24, 1968 |
| [45] | Patented | Apr. 20, 1971 |
| [73] | Assignee | The B.F. Goodrich Company |
| | | New York, N.Y. |

[54] PNEUMATIC TIRE AND METHOD OF MAKING SAME
5 Claims, 3 Drawing Figs.

[52] U.S. Cl. .................................................. 152/354, 156/117
[51] Int. Cl. .................................................. B60c 9/02, B60c 9/12
[50] Field of Search .......................................... 152/354, 355, 356; 156/117

[56] References Cited
UNITED STATES PATENTS
2,906,314  9/1959  Trevaskis ..................... 152/356
2,952,293  9/1960  Billingsley ..................... 152/362

FOREIGN PATENTS
498,507  4/1937  Great Britain ................ 156/117

Primary Examiner—Arthur L. La Point
Attorneys—W. A. Shira, Jr. and H. S. Meyer

ABSTRACT: A pneumatic tire of cord-reinforced vulcanized elastomeric material having a carcass formed of a tape of elastomer-covered reinforcing cords wound in a generally geodesic pattern with the beads each being formed of substantially tangentially disposed portions of the tape with an inextensible ring between layers of the tape. The method of making such a tire comprises continuously winding layers of a tape of elastomer-covered cords in a generally geodesic pattern on a tire building drum, applying an inextensible ring to the partially wound tire at either end of the drum and then completing the winding so that the rings are imbedded between layers of the tape.

PATENTED APR 20 1971 3,575,227

INVENTOR
DONALD R. BARTLEY
BY W. A. Shira Jr.
ATTY.

PNEUMATIC TIRE AND METHOD OF MAKING SAME

BACKGROUND OF THE INVENTION

Attempts have been made in the past to form a tire carcass completely from a strip or tape of reinforcing cords covered with uncured elastomeric by winding such a strip in a generally geodesic pattern over a drum in successive layers with the tire beads being formed by successive portions of the strip extending generally tangentially of the rim opening in the tire. A tire carcass formed in such a manner lends itself readily to rapid fabrication in that the conventional time-consuming, and therefore costly, hand lamination of plies of elastomeric fabric is eliminated from the tire building procedure.

However, the advantages of labor saving obtained from making a tape or strip wound tire carcass are, in part, outweighed by the disadvantages of insufficient strength and/or prohibitive extensibility in the bead regions of such a tire. This will be understood when it is remembered that a tire, wound as just described, depends for retention upon a wheel rim by tightening thereon of the tangentially extending portions of the tape when the tire is inflated, there being no bead core as in a conventional carcass of laminated plies of elastomer covered, bias-oriented, reinforcing cords.

The aforementioned tangential disposition of the tape winding in the bead regions of a tape wound carcass results in bead regions which remain quite flexible even after vulcanizing. This permits easy installation of the completed tire on a wheel rim but may not provide sufficient inextensibility or rigidity to prevent disengagement or "popover" of the bead from the rim under inflation pressure. Furthermore, storage of the completed tire in areas of high ambient temperature may cause the beads of the tire to shrink or otherwise distort, especially if the cord reinforcement is of a polyamide material, thus making mounting of the tire extremely difficult and often impossible. This problem of bead shrinkage and/or distortion is particularly acute in tires of sizes such as those used on trucks, farm tractors, earth movers and other off-the-road machinery.

SUMMARY OF THE INVENTION

The present invention provides a solution to the above described problems by the incorporation of a substantially inextensible reinforcement in the bead structures of a tire carcass while it is being formed by winding it from a strip of elastomer-covered reinforcing cords. Specifically, the reinforcement of the beads is provided by an inextensible, preferably metal, ring concentrically placed adjacent the rim openings of the tire during the tape winding thereof so that the rings are embedded between layers of the winding when the tire is removed from the drum, expanded to toroidal configuration, and vulcanized.

DETAILED DESCRIPTION

Figure 1:
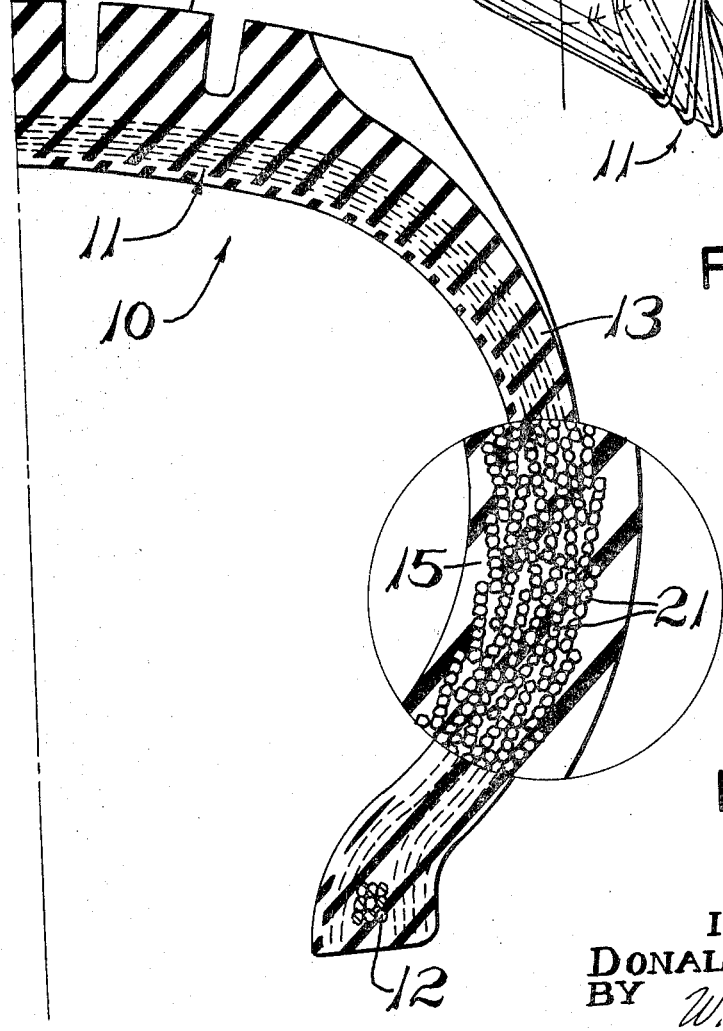
FIG. 1 is a partial cross section of a vulcanized tire embodying the invention with a portion magnified, and having the dimensions of the tape exaggerated, to show the reinforcement of the tire.

Referring first to FIG. 1, the completed tire 10 is shown as having a carcass formed of a wound tape reinforcement 21 with an inextensible bead ring 12 embedded between layers of windings in each of the two bead regions. The view of FIG. 1 is symmetric about the centerline such that only one each of the two beads 12 and two sidewalls 13 is shown. Similarly, only one-half of the tread 14 and the liner layer 15, provided for tubeless inflation, are shown.

Figure 2:
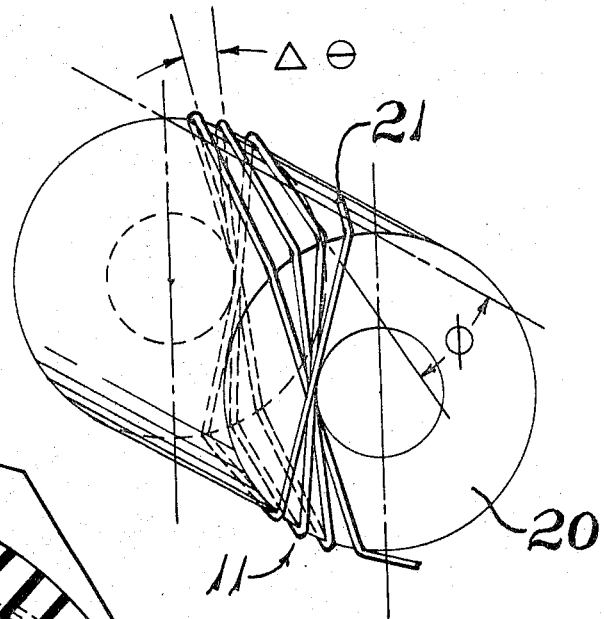
FIG. 2 is a diagrammatic, isometric view of the tire building drum showing the beginning of the tape winding; and, FIG. 3 is a partial cross section of the tire building drum at completion of the tape winding, illustrating the location of one of the bead rings, the dimensions of the tape being exaggerated to more clearly show the arrangement thereof.

Referring now to FIG. 2, a preferably straight cylindrical building drum 20, having a collapsing mechanism (not shown) for removing a completed carcass from the drum, is diagrammatically represented with the beginning of a wound carcass 11 of tape 21 wrapped therearound. One method which may be used to wind the carcass is that of rotating the drum on its axis and simultaneously orbiting it about another fixed axis skewed to the axis of drum, as taught by U.S. Pat. No. 3,112,234. The tape 21 comprising elastomer-covered reinforcing cords of preferably calendered stock is wound around the drum in a substantially geodesic pattern forming successive straight tangents to an inner bead circle of desired diameter corresponding to the rim opening in the completed tire. In the preferred practice the tape 21 is continuously wound; however, it is not a requirement of the invention that the tape be continuous. The tape 21 is wound such that it makes an angle $\Phi$, shown in FIG. 2, with the axis of the tire when passing over the cylindrical surface of the building drum where $$25° \leq \Phi \geq 60°.$$

In the preferred practice a straight cylindrical drum is used, instead of the more common spherical drum known in the art for tape-winding tires, in order to permit improved tangential arrangement of the tape winding for forming the beads. Each successive revolution of the winding tape is indexed an amount with the previous winding such as to subtend a central radial angle $\Delta\Theta$ which is constant for all winding on a given carcass and is chosen to have a value expressed in radians within the limits $$\pi/60 \leq \Delta\Theta \leq 60/61 \, \pi.$$

In the presently preferred form of the invention, the drum axis is positioned at an angle $\Phi$ with a turntable and with the turntable axis passing through the centroid of the drum. The tape is fed continuously to the drum while the turntable is rotated. The drum is rotated at generally a constant speed about its axis and moves through a central angle $\Delta\Theta$ for every revolution of the turntable. In this manner successive layers of winding may be continuously wound on the drum; however, the invention is not limited to this method of winding elastomeric tape and any other suitable method may be used.

For tubeless inflation, a layer of air-impervious elastomer 15 is laid over the drum 20 prior to applying the tape 21. The tape is wound until the drum has been completely covered, the bead regions being formed by overlapping tapes tangential to the bead circle.

Referring again to FIG. 2, when a desired number of layers of tape 21 have been applied to the building drum 20, an inextensible bead ring insert 12, preferably of metal, is placed axially over each of the bead regions of the tape-wound carcass concentric with the inner periphery of the bead. In the preferred practice of the invention, at least one-third to one-half of the total number of layers of winding are completed before the ring inserts 12 are applied; thus, in the embodiment of FIG. 2 two layers are completed before the bead rings are placed on the ends of the carcass. Two complete layers of the tape 21 have been completed when the drum is completely covered for the first time with the tape winding indexed through an angle $\Delta\Theta$ within the limits described above. After the ring inserts 12 have been applied, the remaining two complete layers of tape 21 are wound over the drum and the bead ring inserts 12 to complete the carcass. This results in a four-ply tire carcass construction of geodesically wound tape reinforcement. The invention, however, is not limited to a four-ply construction and as many plies or layers of tape reinforcement may be incorporated as desired, to provide the carcass strength required for a particular size and load-carrying capability.

If a six-ply construction is desired in the present practice of the invention, the bead ring inserts 12 are applied after the first two complete layers of tape winding, similar to the arrangement for a four-ply construction. The remaining four-plies of the tape 21 are wound on the carcass after application of the ring inserts 12, thus giving a completed six-ply tape-reinforced tire carcass.

In a similar manner, if an eight-ply construction is desired, initially 4 complete layers of tape winding 21 are applied to the building drum 20 prior to the application of the ring inserts 12. The remaining four-plies of tape winding are then applied to thereby form a completed eight-ply tire carcass. Other combinations of ply reinforcement are possible; however, in the presently preferred practice of the invention, the ring is applied after one-third—one-half of the total number of complete layers of tape winding 21 are applied to the drum.

Figure 3:
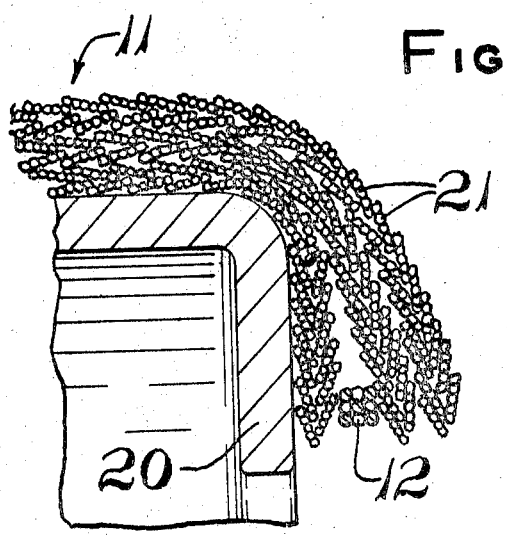

Referring to FIG. 3, a portion of a section of the building drum 20 is shown with the tape wound carcass completed to the stage preparatory to the application of the sidewalls and tread. The drum and tire carcass in FIG. 3 are symmetric about the indicated centerline of the drum and also are symmetric about the indicated vertical centerline perpendicular to the axis of the drum, with the remaining portions of the drum and tire carcass omitted from the view of FIG. 3. The embodiment of FIG. 3 shows in detail the placement of the bead ring inserts 12 as they occur in a six-ply tire carcass. The first two complete layers of tape winding appear as one ply-bundle next adjacent the drum. The bead ring insert 12 is shown in its presently preferred form having a substantially square transverse cross section and being fabricated conventionally of bundled wire. The remaining four-plies of tape wound reinforcement are shown in FIG. 3 as two bundles of ply material superposed over the initial two-plies and the bead ring insert 12.

After application of the carcass reinforcement tape 21 to the building drum has been completed, uncured elastomeric material is applied to form the tread and sidewalls of the tire. The carcass is then removed from the building drum by an internal collapsing mechanism and the carcass is expanded to a full toroidal configuration and vulcanized in a mold to the desired final shape.

As mentioned above, the bead ring 12 is preferably of conventional bundled wire construction; however, alternatively a solid metal or welded ring may be used to form the beads 12 or the bead may be fabricated of a continuously wound flat strip of metal. Other materials may also be found suitable if such materials provide sufficient tension resistance to the forces in the bead which are encountered in a completed tire when it is mounted on a wheel rim and inflated. In the present practice of the invention, the bead insert 12 must have a mean diameter no greater than the largest diameter of the flange of the wheel rim upon which the tire is to be mounted.

Thus, the present invention provides a solution to the problem of the tensile weakness of the geodesically wound tape wire carcass in the bead region, which often results in expansion of the beads when the completed tire is pressurized on a wheel rim such that the beads dismount or "pop-over" the flange of the wheel ring. The bead ring 12 is also generally two-thirds of the cross-sectional area of the bead required for a conventionally constructed tire.

The inextensible ring 12 provides dimensional stability to the bead diameter when the tire is exposed to elevated ambient temperatures during storage. If nylon reinforcing cords are used in the tape 21, substantial shrinkage may occur during storage at high ambient temperatures.

The present invention thus provides a pneumatic tire having a carcass reinforced with geodesically wound tape and having an inextensible ring insert in each of the bead regions of the tape-wound carcass. The inserts provide heretofore unobtainable tensile strength in the beads of such a carcass and further provide dimensional stability for the tire beads when the tire is subjected to variations in ambient temperature, loads and inflation pressures.

Since the inextensible ring which reinforces the bead regions is substantially smaller in cross section than the bead ring of a conventional tire, the bead region of the present tire is more flexible than tires of corresponding size of conventional construction. The increased flexibility of the beads thus permits easier mounting and dismounting on a wheel rim.

Modification and adaptations may be made within the purview of the invention by those having ordinary skill in the art and the invention is limited only by the spirit and scope of the appended claims.

I claim:

1. A generally toroidal pneumatic tire of vulcanized elastomer having a central opening defined by two axially spaced beads adapted for mounting on a wheel rim having a flange, the said tire comprising:
   a. a carcass wound in successive layers from a tape of elastomer covered cords extending in a generally geodesic overlapping pattern with the said beads defined by portions of said tape extending generally tangentially of the said central opening; and
   b. a substantially inextensible ring insert embedded intermediate the layers of said wound tape in each of the beads radially outwardly of said central opening with each ring having a mean diameter less than the diameter of the flange of the wheel rim upon which the tire is to be mounted.

2. The tire defined in claim 1, wherein the said ring insert comprises a continuous ring of metal having a generally square transverse cross section.

3. The tire as defined in claim 1, wherein each of said ring inserts is an annular member comprising a plurality of wire filaments disposed in parallel bundled relationship.

4. The method of making a pneumatic tire of cord-reinforced elastomer comprising:
   a. providing a tape of unvulcanized elastomer covered reinforcing cords;
   b. winding said tape over a generally cylindrical drum having a diameter substantially less than that of the tread portion of the completed tire in a substantially geodesic pattern of successive, circumferentially indexed windings with portions of the windings extending over the ends of the drum tangentially of a central circular region defining the rim opening of the carcass;
   c. applying a ring of inextensible material axially to each end of the windings prior to completion of the winding with the ring disposed concentric with each circular region;
   d. completing the winding by applying layers of said tape to the drum in a substantially geodesic pattern of successive windings until the entire periphery is covered with the desired number of layers;
   e. applying uncured elastomer on the carcass before removal from the drum for forming the tire tread and sidewalls;
   f. removing the carcass from the drum;
   g. expanding the carcass to generally toroidal configuration; and
   h. vulcanizing the carcass in the generally toroidal state.

5. The method defined in claim 4 wherein one-third to one-half of the total number of layers of tape windings are applied prior to application of the rings and said remaining layers of tape windings are applied after application of the ring on each bead.

PO-1050
(5/69)

UNITED STATES PATENT OFFICE
CERTIFICATE OF CORRECTION

Patent No. 3,575,227      Dated 4/20/71

Inventor(s) Donald R. Bartley

It is certified that error appears in the above-identified patent and that said Letters Patent are hereby corrected as shown below:

Column 4, line 66-67, "ring" should read ---rings--- and "on each bead" should be deleted.

Signed and sealed this 24th day of August 1971.

(SEAL)
Attest:

EDWARD M. FLETCHER, JR.
Attesting Officer

WILLIAM E. SCHUYLER, JR.
Commissioner of Patents